United States Patent [19]

Aharoni

[11] Patent Number: 5,389,721

[45] Date of Patent: Feb. 14, 1995

[54] PROCESS FOR PREPARING EXTENDED CHAIN POLYESTERS AND BLOCK OR GRAFT COPOLYESTERS

[75] Inventor: Shaul M. Aharoni, Morris Plains, N.J.

[73] Assignee: AlliedSignal Inc., Morris Township, Morris County, N.J.

[21] Appl. No.: 250,313

[22] Filed: May 27, 1994

Related U.S. Application Data

[63] Continuation of Ser. No. 899,079, Jun. 15, 1992, abandoned.

[51] Int. Cl.$^6$ .................... C08L 67/00; C08G 3/76
[52] U.S. Cl. .................... 525/50; 525/418; 525/437; 528/287
[58] Field of Search .............. 525/418, 419, 437, 50; 528/287

[56] References Cited

U.S. PATENT DOCUMENTS

| | | | |
|---|---|---|---|
| 2,578,660 | 12/1951 | Auspos | 528/276 |
| 3,511,811 | 5/1970 | Comy | 528/283 |
| 4,390,667 | 6/1983 | Aharoni et al. | 525/420 |
| 4,417,031 | 11/1983 | Aharoni et al. | 525/428 |
| 4,417,032 | 11/1983 | Khanna et al. | 525/432 |
| 4,433,116 | 2/1984 | Largman et al. | 525/420 |
| 4,568,720 | 2/1986 | Aharoni et al. | 525/50 |
| 4,946,909 | 8/1990 | Bhattacharjee et al. | 525/432 |
| 4,963,311 | 10/1990 | Aharoni et al. | 264/210.8 |
| 5,055,509 | 10/1991 | Bhattacharjee et al. | 524/136 |
| 5,326,830 | 7/1994 | Aharoni | 525/418 |

FOREIGN PATENT DOCUMENTS

| | | |
|---|---|---|
| WO91/05815 | 5/1991 | European Pat. Off. |
| WO92/17519 | 10/1992 | European Pat. Off. |
| WO92/17520 | 10/1992 | European Pat. Off. |
| WO92/17522 | 10/1992 | European Pat. Off. |
| 206695 | 12/1983 | New Zealand |

Primary Examiner—James J. Seidleck
Assistant Examiner—I. Zemel
Attorney, Agent, or Firm—Michele G. Mangini; Roger H. Criss; Melanie L. Brown

[57] ABSTRACT

A process for forming extended chain polyesters and block or graft polyesters or copolyesters which comprises the steps of (a) forming an intimate mixture of one or more polyesters, and an effective amount of one or more chain extension reagents, which are phosphorous (III)-containing compounds, and (b) heating said mixture for a time and at a temperature sufficient to form said extended chain, or graft or block copolyester or polyester; wherein the polyester used in step (a) contains no or substantially no substances which comprise elements from groups VA and VIA of the periodic table in elemental form; and wherein preferably, said polyesters contain one or more elements belonging to groups IIA, IIIA, IVA, VB, IIB, IIIB, IVB, VIII and the lanthanides.

22 Claims, 1 Drawing Sheet

PROCESS FOR PREPARING EXTENDED CHAIN POLYESTERS AND BLOCK OR GRAFT COPOLYESTERS

This application is a continuation of application Ser. No. 7/899,079, filed Jun. 15, 1992, now abandoned.

BACKGROUND OF THE INVENTION

1. Field of Invention

This invention relates to the process for coupling polyester materials. Coupling polyesters includes preparing extended chain polyesters, and graft or block polyesters and copolyesters. Coupling as described above is referred to herein as a chain extension process. Improved extended chain polyesters, and block or graft copolyesters of this invention lack discoloration attributes of many materials of the prior art. Extended chain polyesters, and block or graft polyesters and copolyesters prepared in accordance with the process of this invention are capable of being fabricated into useful shaped articles of manufacture, e.g. filaments, both mono- and multifilament, films, tapes, ribbons, rods, laminates and the like.

2. Description of the Prior Art

U.S. Pat. No. 4,568,720 to Aharoni discloses a process for preparing extended chain polyesters, and block or graft polyester or copolyesters by forming an intimate mixture of one or more polyesters and an effective amount of one or more chain extension reagent compounds, and thereafter heating the intimate mixture at a temperature and for a time sufficient to form the desired amount of the desired polyester or copolyester.

SUMMARY OF INVENTION

In accordance with this invention, there is provided a process for forming extended chain polyesters and block or graft polyesters or copolyesters which comprises the steps of:

(a) forming an intimate mixture of one or more polyesters, and an effective amount of one or more effective chain extension reagent compounds;

(b) heating said mixture for a time and at a temperature sufficient to form said extended chain, or graft or block copolyester or polyester; wherein the polyester used in step (a) contains no or substantially no substances which comprise elements from groups VA and VIA of the periodic table in elemental form or any other form, for example, inorganic or organic compounds, complexes or salts.

A further embodiment of this invention relates to the a process for forming branched polyesters. The branched polyesters are formed by adding chain branching agents to the intimate mixture of step (a) described in the above process.

Another embodiment of this invention relates to polyester based on a polyester, copolyesters or block or graft copolymers prepared in accordance with the process of this invention as well as articles formed from these polymers and polyesters comprising the polyesters of this invention.

The process and products of this invention are advantageous since the chain extended polyester maintains or substantially maintains the original color of the polymer reactants. In other polyester chain extension processes, the color of the original polymer reactants is not maintained and the chain extended polymer has a color which is different from the original polymer reactants. The difference in color can be a change to a color other than that of the polymer reactants, or the difference in color can also be a change in degree or intensity of color present in comparison to the color of the original polymer reactants. The maintenance of the color qualities can be measured by methods known in the art. Since the process of this invention overcomes the undesirable side-effects of other polyester chain extension reactions, it is clearly of commercial advantage.

DETAILED DESCRIPTION OF THE INVENTION

Figure 1:
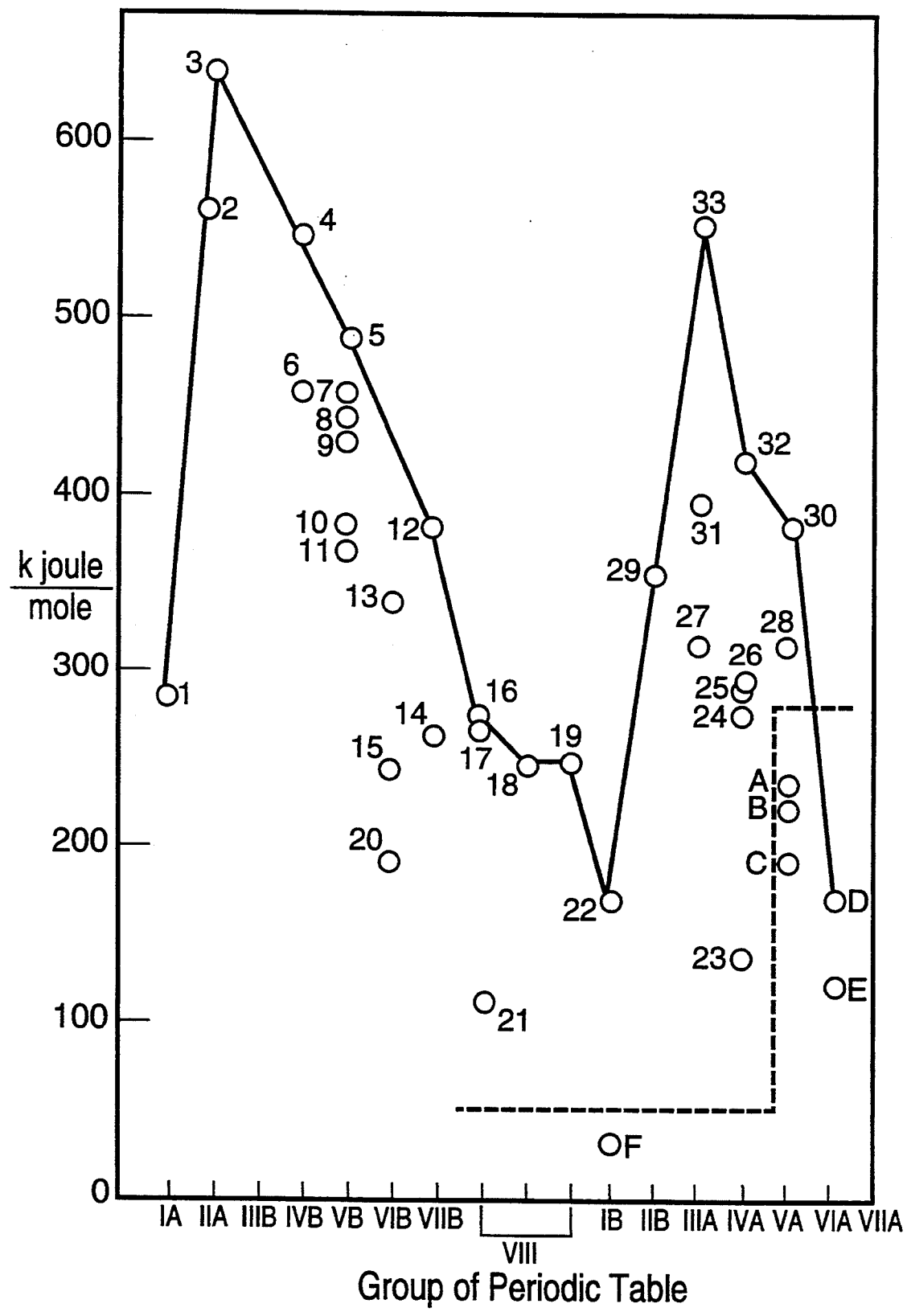
FIG. 1 is a graph of the heat of formation of selected oxides of table II as a function of the group of the Periodic Table to which the element forming the oxide belongs.

Chain extension reactions of polyesters, such as poly(ethyleneterephthalete) (PET), with a phosphorus (III) chain extension reagent, such as triphenylphosphite (TPP), at effective melt temperatures result in an increase in the molecular weight of the polymer. We have found that the chain extension of polyesters by reaction with one or more phosphorus (III)-containing chain extension reagents, such as aryl phosphites, can take place and maintain or substantially maintain the original color of the polyester and/or copolyester reactants provided that the reactant polyesters contain no or substantially no substances which comprise elements from groups VA and VIA of the periodic table in elemental form or any other form from which the group VA and/or VIA component is reduced to elemental form by the process conditions. The substances can be of many forms, for example inorganic or organic compounds, complexes or salts containing of substances which comprise elements of group VA or VIA. It is noted for example that in the presence of substances like oxides or organic salts or organic coordination compounds of antimony, arsenic, bismuth, tellurium and selenium, or in the presence of residues from polymerization (esterification) catalysts containing one or more of these substances; a reaction with the chain extension reagent takes place in which the valence of the Group VA or VIA component(s) is reduced to zero. The elements from group VA and VIA precipitate as very fine particles, e.g. about 1 micron or less, changing the color of the reactant polyesters. It is our belief that the dispersion of the elements in the chain extended polyester as very fine particles of 1 micron or less can also be a substantial factor in causing the color change. When reduced to their elemental form (valence=0), the substances of group VA and VIA of the periodic table can develop a dark color (e.g. red, brown, dark green, charcoal or black color), causing the change in color (discoloration) in the chain extended polymer from the color of the original polyester reactant. For example, the chain extended polyester may be of a grey or darkened color in comparison to the original reactant polyester, which is often colorless or an opaque color. A colorless or opaque color is often preferred for many applications of plastic materials in commerce. For applications, such as food packaging, a discolored or darkened film (i.e. a film having discoloration) is substantially undesirable since a consumer, when viewing a product wrapped in such a film, may perceive incorrectly that the product is unclean or unsanitary.

The maintenance of the color qualities can be measured by methods known in the art. Such methods include measuring the color quality differences by employing a visible-light spectrometer for detection of color changes, including the appearance of a substantially different color from the reactant polyesters. A densitometer can be used to measure the degree of color change as known in the art.

Often substances which comprise elements belonging to group VA and VIA of the periodic table are present in the original polymer as components which serve as polymerization catalysts. Irrespective of their presence as catalysts or other uses, such substances are not desired for purposes of this invention.

In preferred embodiments a catalyst employed for the original polymerization of the polyester is selected from those inorganic and organic catalysts that contain substances which do not reduce to elemental form by the reaction with the chain extension reagent (e.g. aryl phosphite) at elevated temperatures of the chain extension process. The catalysts employed should also not attack the polymers after their formation. Preferably, the catalyst is selected from catalysts which contain substances belonging to groups IIA, IIIA, IVA, IIB, IIIB, IVB, VB, VIII and lanthanides. Catalysts from these groups are used to catalyze the initial polymeric condensation for forming polyesters without subsequent discoloration of the polyester formation during the chain extension reaction. More preferably, the catalyst is selected from catalysts which contain substances belonging to groups IIA, IIIA, IVA, IIB, IIIB, IVB, VB and VIII. In alternatively preferred embodiments, catalysts for polymerization of the polyester are catalysts which contain calcium, magnesium, titanium, zirconium, vanadium, zinc, lead aluminum, indium, silicon, cobalt germanium, tin, yttrium, neodymium or a combination thereof. Illustrative of useful catalysts are germanium oxide, neodymium acetate or acetyl acetonate, lead (II) acetate, titanium (IV) alkoxides, tin alkoxides, zirconium alkoxides and acetates as well as acetates or magnesium, calcium and zinc (the alkoxide moiety contains an alkyl having 1 to 8 carbons). Many of these catalysts are commercially avaliable. U.S. Pat. No 4,435,546 to Bier et al. discloses numerous such polyester polymerization catalysts. Organo-cobalt catalysts can be employed also. Catalysts or other substances containing antimony, arsenic, bismuth, tellurium or selenium are specifically excluded from the list of catalysts desirable for the purpose of this invention. In many of the preferred embodiments of this invention, silver containing materials, e.g. silver oxide, are also excluded from the reactant polymer. It is also noted that some transition elements, i.e. catalysts containing them, leave behind colored residues, mostly oxides, which are undesired in the art.

Once a polyester, such as poly(ethylene terephthalate), is obtained commercially or is prepared by polycondensation in the presence of one or more catalysts, the chain extension of the polyester is conveniently carried out in two steps. The first step of the process consists of forming an intimate mixture of one or more appropriate polyesters and one or more effective chain extension reagent compounds. In the second step of the process, the intimate mixture is heated at a temperature and for a time sufficient to mix ingredients thoroughly and form the desired extended chain polyester, or block or graft copolyester or polyester, as indicated by a decrease in the melt index and/or an increase in the viscosity of the polymer mixture.

In a preferred embodiment of this invention, a intimate mixture of one or more polyesters and phosphite in the first process step is a molten mixture. As used herein, "molten mixture" is an intimate mixture which has been heated to a temperature which is equal to or greater than the melting point of at least one of the polymer components of the mixture. The manner in which the molten mixture is formed is not critical and conventional methods can be employed. For example, the molten mixture can be formed by maintaining the polymer product of the polycondensation in the molten state or through use of conventional polymer and additive blending means, in which the polymeric components are heated to a temperature equal to or greater than the melting point of at least one of the polymers, and below the degradation temperature of each of the polymers. In a particularly preferred embodiment of this invention, the polymers are heated above the melting point of each of the polymers in the mixture. An effective amount of one or more chain extension reagent compounds in a liquid or powdered form is added to the melted polymers while at the same time vigorously stirring the melt, or added prior to melting and mixing. Heating is continued until the desired extended chain, or block and/or graft polyester or copolyester is formed as indicated by an increase in the melt viscosity.

In a more preferred embodiment, the components of the intimate mixture can be granulated, and the granulated components mixed dry in a suitable mixer, as for example, a tumbler or a Banbury Mixer, or the like, as uniformly as possible. Thereafter, the composition is heated in an extruder until the polymer components are melted. As described above, the mixture is heated until the desired extended chain, or block and/or graft copolyester or polyester is formed as indicated by an increase in the melt viscosity. Thereafter the mixture is ejected with cooling. In the most preferred embodiment, one or more effective chain extension reagents are injected directly into the molten stream of polymer formed from the polycondensation reaction wherein the polymer and phosphites are thoroughly mixed prior to subsequent processing.

The order of mixing of the various components of the intimate mixture is not critical. Accordingly, the order of addition of the polymers and chain extension reagent compounds and other optional components to be described in more detail hereinbelow, to form the intimate mixture, can be varied as desired.

The process can be carried out in a batchwise or discontinuous fashion, as for example, carrying out the process in a sealed container. Alternatively, the process can be carried out in a continuous fashion in a single processing zone, as for example, by use of an extruder as described hereinabove, or in a plurality of such reaction zones, in series or parallel.

Reaction temperature can be varied over a wide range. However, it should be appreciated that the process temperature employed in any specific instance will depend on the particular polyesters employed and, in the preferred embodiments should be at least as high as the melting point of semi-crystalline polyesters or the glass transition temperature of amorphous polyesters, and below the degradation temperature of such polyesters. In the preferred embodiments of this invention, the process temperature is such that the polyesters will remain in the molten state at the extended chain polyester, or block or graft polyester or copolyesters are formed. Normally this can be accomplished in one of two ways. Either the process can be carried out at a temperature which is equal to or greater than the melting point of the desired product; or process temperatures can be increased periodically over the course of the conduct of the process so as to maintain the mixture in the molten state. An optimal process temperature is the highest temperature which is below the degradation temperature of the polyester or polyesters. In the particularly preferred embodiments of this invention employing particularly preferred polyesters compositions, the process temperature is at least about 150° C. Amongst these particularly preferred embodiments, most preferred process temperatures are in the range of from about 200° C. to about 300° C.

Similarly, process pressures are not critical and can be varied widely without adversely affecting the process. Consequently, the process can be conducted at sub-atmospheric, atmospheric or super-atmospheric pressures. However, for convenience the process is carried out at atmospheric or autogenous pressure.

The process is carried out for a time sufficient to form the desired extended chain polyester, or block or graft polyester or copolyester as is indicated by the decrease in the melt index and increase in the viscosity of the mixture. Reaction times can be varied over a wide range. Usually, reaction times will depend on a variety of factors such as the polymeric components, reaction temperatures, chain extension reagent compound and its concentration, and other factors known to those of skill in the art to affect reaction times. In most instances, the reaction time can vary from a few seconds to 24 hours or more. In the preferred embodiments of this invention, reaction times will vary from about 1 min. to about 2 hours and in the particularly preferred embodiments from about 2 min. to about 30 to 60 min.

Best results are obtained when the process of this invention is carried out in the presence of as little water as possible. Ideally, the conditions will be anhydrous, and this represents the most preferred embodiment of the invention. However, good results can be obtained when as much as 0.165 weight percent water based on the total weight of the mixture is present therein. In the preferred embodiments, the weight percent of water is less than about 0.1 weight percent, and in the particularly preferred embodiments, the weight percent of water is less than about 0.05 weight percent on the same basis.

The process of this invention employs one or more chain extension reagents. An effective chain extension reagent is a compound containing a trivalent phosphorus atom (phosphorus III) to which is attached at least one effective leaving group, but not more than three leaving groups. The effective leaving group contains a hetero atom bonded to the phosphorus atom, and the hetero atom is bonded to a carbon which is double bonded to an atom other than the hetero atom. Preferably, the hetero atom is nitrogen or oxygen. The hetero atom either forms a conjugated system with the double bonded carbon or the hetero atom is bonded to a carbon of a conjugated system. It is believed that the conjugated system of the leaving group provides the leaving group with the ability to delocalize negative charge and therein the leaving group is a "stable" moiety. The phenomenon of stability as used herein relates to the ability of the leaving group to delocalize negative charge within its structure.

An effective leaving group can be a cyclic aromatic or cyclic non-aromatic. It is noted that cyclic includes monocyclic and polycyclic moieties. Preferably, the leaving group is a cyclic structure; that is the hetero atom of the leaving group is part of a cyclic ring or the carbon to which the hetero atom is bonded is part of a cyclic ring. It is proposed that the cyclic structures can more efficiently delocalize negative charge than a linear leaving group. When the hetero atom is part of the cyclic ring it is preferred that the hetero atom is nitrogen. Chain extension reagents having such nitrogen bonded to the phosphorus atom are referred to herein as phosphinamines.

Illustrative of such phosphinamines are the phosphorus trislactams disclosed in the published International Application WO9200-305A, commonly assigned to Allied-Signal Inc. Such compounds are efficient chain extension reagents and may be used instead of or in combination with any other effective chain extension reagents. Illustrative of such phosphinamines are phosphorus triscaprolactam, phosphorus tris(2-pyrrolidone),phosphorus trislaurolactam and tris caprylolactam. The formula for phosphorus triscaprolactam is shown below.

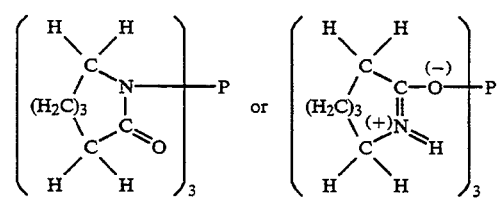

It is noted that phosphorus (III) chain extension reagent need only have one lactam as a leaving group. The remaining moieties attached to the phosphorus atom may be similar leaving groups or other varied leaving groups which are discussed infra.

In alternatively preferred embodiments of the invention, the phosphinamines chain extension reagents are compounds having at least one bond of a trivalent phosphorus atom bonded to the nitrogen of an imide. Basically, the leaving group is an imide such as succinimide, phthalimide and maleimide as shown below.

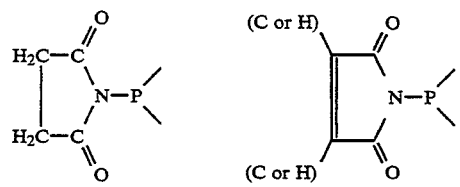

In further preferred embodiments of this invention, the chain extension reagent has (a) one or more aryl containing leaving groups wherein the hetero atom of the chain extension reagent is bound to a carbon atom of the aryl group and/or (b) one or more leaving groups wherein the hetero atom is actually part of an aromatic ring (although the hetero atom is bound to the other ring atoms through single bonds only). Illustrative of heteroaromatic leaving groups are pyrrolyl, indolyl, carbazolyl, imidazolyl and benzimidazolyl.

Of particular interest are the aryl containing chain extension reagents which are phosphites, i.e. a phosphorus atom single bonded directly to three oxygen atoms. Illustrative of effective phosphite chain extension reagents are phosphites having one or more aryloxy groups bound directly to the phosphorus atom of the phosphite. Often an effective phosphite is a compound which is commonly referred to as a phosphite ester or polyphosphite ester. More specifically, an aryloxy containing phosphite as described above is referred to as an aryl phosphite ester. The aryloxy moiety of the phosphite can be derived from any aromatic alcohol which contains a hydroxylated aryl group; wherein the aryl group is substituted or unsubstituted yet the aryl ring itself is hydroxylated. Useful aromatic compounds employed in forming the aryloxy groups are mono-, di- and other polycyclic aromatics, which include but are not limited to substituted and unsubstituted benzenes, naphthalenes, anthracenes, biphenyl or polyphenyl compounds, methylene bridged aromatic compounds and the like. Preferably, the aromatic group which forms the arlyoxy is selected such that the aryloxy group is a least hazardous, volatile or toxic material.

Useful phosphite esters, and polyphosphite esters are known compounds. The polyphosphite esters, which may be symmetrical or asymmetrical, have more than one aryl phosphite ester. Such compounds can be conveniently prepared by reacting phosphorus trichloride and one or more alcohols at least one of which is an aromatic alcohol. For example, triphenyl phosphite can be prepared by reacting three moles of phenol with one mole of phosphorus trichloride, and trisnonyl phenol phosphite can be prepared by reacting three moles of nonylphenol with one mole of phosphorus trichloride. Mixed phosphites such as diphenyl isodecyl phosphite, diphenyl isooctyl phosphite and phenyl diisodecyl phosphite, can be prepared by reacting an appropriate mixture of aromatic and aliphatic alcohols with phosphorus trichloride. Similarly, useful phosphites containing more than one phosphite ester moiety can be prepared by reacting aromatic and aliphatic alcohols at least one of which is polyhydric with phosphorus trichloride.

Illustrative of useful phosphite esters and polyphosphite esters are compounds of the formula:

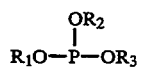

and asymmetrical and symmetrical phosphite derivatives thereof having more than one phosphite ester moiety wherein:

$R_1$, $R_2$ and $R_3$ are the same or different and are hydrogen, metal cations, ammonium radicals, or substituted or unsubstituted aryl or alkyl wherein permissible substituents are one or more alkyl, alkoxy, cyano, nitro or halo groups, or $R_1$, $R_2$ and $R_3$ individually may form a moiety of the formula:

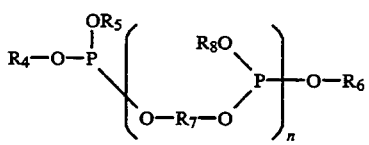

wherein n is 0 or a positive whole number and $R_4$, $R_5$ and $R_6$ are the same or different and are $R_1$, $R_2$ and $R_3$, $R_7$ can be a single bond between the two oxygens, or a divalent aromatic or aliphatic group, $R_8$ can be $R_4$, $R_5$, or $R_6$; and $R_5$, $R_7$ and $R_8$ together can be polyalkoxy group derived from an aromatic or aliphatic polyalcohol; with the proviso that each phosphite moiety includes a substituted or unsubstituted aryl group.

Permissible $R_1$, $R_2$ and $R_3$ groups include aliphatic groups such as t-butyl, n-butyl, isopropyl, hexyl, pentyl, 2-chloroethyl, neopentyl, decyl, dodecyl, isodecyl, butoxyethyl, 3-chlorobutyl and the like; aromatic groups such as 2,4-di-tert-butyl-phenyl, 4-tert-butylphenyl, 3-isopropylphenyl, 2,4-dimethylphenyl, 4-nonylphenyl, octylphenyl, 4-chlorophenyl, 2,4-dibromophenyl, 4-fluorophenyl, 3,5-dichlorophenyl, 4-cyanophenyl, 2-nitrophenyl, bisphenol methyl and the like; metal cations such as sodium, potassium, zinc, lithium, calcium, aluminum, and the like and groups containing one or more phosphite moieties, as for example, ethylene diphenyl phosphite, or a poly-(dipropylene glycol) phenyl phosphite moiety bonded to the oxygen atom via the dipropylene glycol moiety.

Preferred for use in the practice of this invention are phosphite esters of the above formula in which:

$R_1$, $R_2$ and $R_3$ are the same or different and are a alkyl, aryl or aryl substituted with one or more alkyl groups, with the proviso that at least one of $R_1$, $R_2$, and $R_3$ is aryl or substituted aryl. More preferred for use are such esters in which at least two of $R_1$, $R_2$, $R_3$ are aryl or alkyl substituted aryl, and most preferred for use are those esters in which $R_1$, $R_2$, and $R_3$ are the same or different and are aryl or alkyl substituted aryl, such as nonyl phenyl or 2,4-di-tert butyl phenyl. For many of the preferred embodiments, $R_1$, $R_2$, and $R_3$ are selected from phenyl groups, bisphenyls and "novolac-type" polyphenyls known in the art and described herein infra.

Preferably, $R_7$ is an alkoxy or polyalkoxy derived from a divalent aromatic alcohol such as bisphenol A or a biphenol. When $R_5$, $R_7$ and $R_8$ together are a polyalkoxy of a polyalcohol, the polyalcohols may be a pentaerythritol, pyrogallol, tetrahydroxy benzophenone, and saccharides, such as galactose, or polyalcohols such as phenol-aldehyde or resorcinol-formaldehyde oligomers and the like.

Illustrative of several useful phosphite esters within the scope of the above-structural formula are triphenyl phosphite, diphenyl phosphite, tris(nonylphenyl) phosphite, di-phenyl isodecyl phosphite, phenyl diisodecyl phosphite, diphenyl isoctyl phosphite, phenyl diisodecyl phosphite, poly(dipropylene glycol) phenyl phosphite, poly(4,4-isopropylidene diphenol neopentyl alcohol phosphite), bis-(2,4-di-t-butylphenyl) phosphite.

Additional phosphite esters which can be employed in the practice of the invention are disclosed in the following publications: U.S. Pat. No. 3,367,996 to Strauss; 3,697,459 to Dannels et al.; 3,949,024 to Beck et al. and 5,068,388 to Gatto.

Examples of phosphites having biphenyls and polyphenyls in the arlyoxy group are disclosed by Beck et al. and are shown in the formula below.

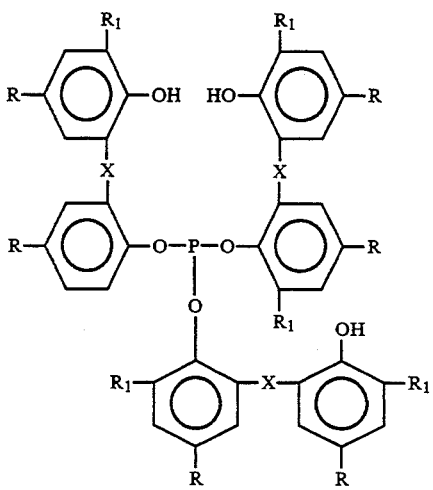

wherein X is sulfur or lower alkylene (e.g. methylene); R is hydrogen or an alkyl radical and $R_1$ is an alkyl radical.

For novolac phosphites, one or more, preferably three of the oxygens of the phosphite ester are bonded the same compound, which may be a dimer, oligomer or polymer of a repeating unit as shown below:

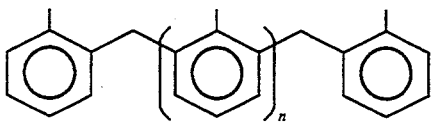

wherein n=0 to about 6.

Some of the "novolac-type" phosphites which are disclosed by Gatto are shown below.

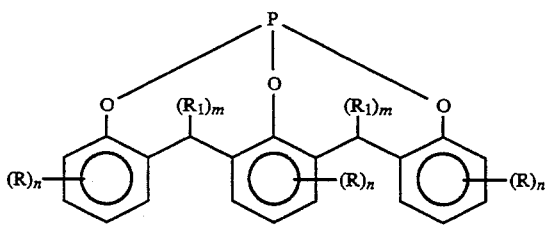

wherein each R and $R_1$ is an independently selected $C_1$-$C_6$ alkyl radical, n=1, 2 or 3 and m=0 or 1.

An effective amount of one or more effective chain extension reagents is employed in forming the intimate mixture. As used herein, "an effective amount" is an amount of the chain extension reagents which when added to the polymeric component in accordance with this invention forms a mixture which when heated forms the desired extended chain polyester, or block and/or graft polyester or copolyester. The formation of the extended chain polyester, and block or graft polyester or copolyester will be accompanied by an increase in the melt viscosity of the mixture and a decrease in the melt flow index of the mixture. As used herein "melt flow index" denotes the rate of extrusion of the polymer mixture through an orifice. The lower the numerical value of the melt flow index the higher is the viscosity of the polymer melt, and conversely, the higher the numerical value of the melt the lower is the viscosity of the polymer melt. The melt flow index is measured in a melt indexer under conditions described and standardized as an ASTM Tentative Method of Measuring Flow Rates of Thermoplastics by Extrusion Plastometer (D1238). As used herein, "viscosity" denotes the internal friction, i.e. resistance to flow of the polymer mixture, and is well known in the art. A wide variety of viscometers are available for measurement of viscosity, such as capillary, rotational, orifice, falling ball, and oscillatory types. They are described in Barr, "A Monograph of Viscometry" Oxford N Y (1931) and Kirk and Othmer, "Encyclopedia of Chemical Technology", Vol. 14, pp. 756–775 the Interscience Encyclopedia, Inc., New York (1955).

In the preferred embodiments of this invention, the quantity of the one or more chain extension reagents employed is at least about 0.05 weight percent, based on the total weight of the mixture. In the particularly preferred embodiments of this invention, the weight percent of reagent compounds is in the range of from 0.1 to about 10 weight percent, and amongst these particularly preferred embodiments, those in which the quantity of reagent compounds employed is from about 0.4 to about 4 weight percent based on the total weight of the mixture are most preferred.

Polymers which may be employed in the process of this invention are linear or branched polyesters. The type of polyester is not critical and the particular polyester chosen for use in any particular situation will depend essentially on the physical properties and features, i.e. flexibility, hardness, toughness, desired in the final shaped article of manufacture. Thus, a multiplicity of linear thermoplastic polyesters having wide variations in physical properties are suitable for use in the process of this invention. One important feature of the polyesters employed is that they must have terminal reactive groups which allow coupling between two or more polyesters chains via the formation of a linking group. Each polyester should have at least one terminal reactive group. In alternative embodiments, the polyesters comprise two terminal groups wherein such polyesters may contain the same terminal group or two different terminal groups. When one polyester contains two identical terminal groups, it is chain extended with a second polyester having two terminal groups which allow coupling with the two terminal groups of the other polymer. Often the polyesters are coupled via the formation of an ester as the linking group. For example, useful polyesters are those that are terminated with a hydroxy and/or carboxy group with the proviso that at least one of each of the two terminal groups is present in the polymers selected for chain extension although an individual polymer need not possess both types of terminal groups. Preferably, the total mole ratio of terminal hydroxy groups to carboxy groups present in all polyesters employed ranges from about 10:1 to about 1:10. More preferably, the total mole ratio of terminal hydroxy groups to carboxy groups present in all polyesters employed ranges from about 4:1 to about 1:4. In further preferred embodiments, the total mole ratio of terminal hydroxy groups to carboxy groups present in all polyesters employed ranges from about 6:5 to about 5:6.

The particular polyester chosen for use can be homopolyester, or a random or block copolyester or terpolymer, or mixtures thereof as desired. Many polyesters are generally prepared by the condensation of an organic dicarboxylic acid and an organic diol, and, therefore, illustrative examples of useful polyesters will be described hereinbelow in terms of these diol and dicarboxylic acid precursors.

Polyesters which are suitable for use in this invention are those which are derived from the condensation of aromatic, cycloaliphatic, and aliphatic diols with aliphatic, aromatic and cycloaliphatic dicarboxylic acids. Illustrative of useful aromatic diols, are those having from about 6 to about 24 carbon atoms. Such aromatic diols include bis-(p-hydroxyphenyl)ether; bis-(p-hydroxyphenyl)thioether; bis-(p-hydroxyphenyl)-sulphone; bis(p-hydroxyphenyl)methane; 1,2-(bis-(p-hydroxyphenyl)-ethane); 1-phenyl-bis-(p-hydroxyphenyl)-methane; diphenyl-(bis-(p-hydroxyphenyl)-methane); 2,2-bis(4-hydroxydimethylphenyl) propane); 1,1- or 2,2-(bis(p-hydroxyphenyl)-butane); 1,1-dichloro- or 1,1,1-trichloro-2,2-(bis-(p-hydroxyphenyl)-ethane); 1,1-(bis-(p-hydroxyphenyl)-cyclopentane); 2,2-(bis-(p-hydroxyphenyl)-propane (Bisphenol A); 1,1-(bis-(p-hydroxyphenyl)-cyclohexane) (bisphenol C); p-xylene glycol; 2,5-dichloro-p-xylylene glycol; p-xylene-diol; the fluoroalkyl and fluoroalkylene analogues of the above and the like.

Suitable cycloaliphatic diols include those having from about 5 to about 24 carbon atoms. Exemplary of such useful cycloaliphatic diols are 1,4-dihydroxy cyclohexane, 1,4-dihydroxy methylcyclohexane, 1,3-dihydroxy-cyclopentane, 1,5-dihydroxycycloheptane, 1,5-dihydroxycyclooctane, 1,4-cyclo-hexane dimethanol, 2,2-bis(4-hydroxycyclohexane)propane and the like.

Useful and aliphatic diols include those having from about 2 to about 12 carbon atoms, with those having from about 2 to about 6 carbon atoms being particularly preferred. Illustrative of such preferred diol precursors are 1,2-ethylene glycol, 1,3-propylene glycol, 1,2-propylene glycol, 1,8-octanediol, 1,6-nonanediol, neopentyl glycol, pentyl glycol, 1,6-hexanediol, 1,4-butanediol, and the like.

Cycloaliphatic diols and aliphatic diols are preferred for use. Propylene glycol, ethylene glycol, neopentyl diol, 1,4-dihydroxy methylcyclohexane, 1,4-butanediol and 2,2-bis(4-hydroxy cyclohexyl) propane are particularly preferred as diol precursors of polyesters for use in the conduct of this invention.

Suitable dicarboxylic acids for use as precursors in the preparation of useful polyesters are linear and branched chain saturated aliphatic dicarboxylic acids, aromatic dicarboxylic acids and cylcoaliphatic dicarboxylic acids. Polyesters containing up to about 80% repeat units of monomer containing both hydroxyl and carboxyl groups, such as hydroxybenzoic acid, vanillic acid, syringic acid and the like, may also be used in the practice of this invention. Illustrative of aliphatic dicarboxylic acids which can be used in this invention are those having from about 2 to about 50 carbons atoms, as for example, malonic acid, dimethylmalonic acid, succinic acid, itanoic acid, ostadecysuccinic acid, pimelic acid, adipic acid, trimethyladipic acid, sebacic acid, suberic acid, azelaic acid and dimer acids (dimerisation products of unsaturated aliphatic carboxylic acids such as oleic acid) and alkylated malonic and succinic acids, such as octadecylsuccinic acid, and the like.

Illustrative of suitable cycloaliphatic dicarboxylic acids are those having from about 6 to about 15 carbon atoms. Such useful cycloaliphatic dicarboxylic acids include 1,3-cyclobutanedicarboxylic acid, 1,2-cyclopentanedicarboxylic acid, 1,3- and 1,4-cyclohexanedicarboxylic acid, 1,3- and 1,4-dicarboxymethylcyclohexane and 4,4-dicyclohexyldicarboxylic acid, and the like.

Polyester compounds prepared from the condensation of a diol and an aromatic dicarboxylic acid are preferred for use in this invention. Illustrative of such useful aromatic carboxylic acids are terephthalic acid and isophthalic acid, 2,6- or 2,7-naphthalenedicarboxylic acid, 4,4'-diphenyldicarboxylic acid, 4,4-diphenylsulphone-dicarboxylic acid, 1,1,3-trimethyl-5-carboxy-3-(p-carboxyphenyl)-indane, diphenyl ether 4,4-dicarboxylic acid bis-p(carboxyphenyl) methane and the like. Of the aforementioned aromatic dicarboxylic acids based on a benzene ring such as terephthalic acid and isophthalic acid are preferred for use and amongst these preferred acid precursors terephthalic acid is particularly preferred. Copolymers and terpolymers prepared from mixtures of the above aromatic diacids are especially preferred.

In the most preferred embodiments of this invention, poly(ethylene terephthalate), poly(butylene terephthalate), poly(ethylene naphthalate) as well as copolymers and terpolymers thereof such as poly(ethylene/terephthalate/2,6-naphthalene dicarboxylate) and poly(tetramethylene/terephthalate/2,6-naphthalene dicarboxylate), are the polyesters of choice. Among these polyesters of choice, poly(ethylene terephthalate) and the copolymers and terpolymers thereof are most preferred.

In additional embodiments of the invention, chain branching agents can be added to the intimate mixture in the first step of the process to produce polyesters having branched polymeric chains. The chain branching agents, preferably of monomeric nature, have a plurality of functional groups. Such agents may contain aromatic amines or aliphatic amines as well as hydroxyl or carboxy groups as functional groups. Preferably, the chain branching agents have at least three functional groups. The branching of the polyesters occurs by the coupling of the reactive groups of the polyesters to the functional groups of the chain branching agents.

The extended chain or branched polyesters, and block or graft polyesters or copolyesters prepared in the process of this invention can be employed directly in many applications without modification. However, various other optional ingredients, which are normally included in polymer compositions, may be added to the mixture at an appropriate time during the conduct of the process. For example, these optional ingredients can be added either prior to or after melting of the polymers in the first step of the process of this invention; or after the conduct of the second step in which the desired block and/or graft copolyester have been formed. Such optional components include fillers, plasticizers, crystallization nucleating agents, impact modifiers, colorants, mold release agents, antioxidants, ultra-violet light stabilizers, lubricants, antistatic agents, fire retardants, and the like. These optional components are well known to those of skill in the art, accordingly, only the preferred optional components will be described herein in detail.

The extended chain or branched polyesters, and block or graft polyesters or copolyesters prepared in the process of this invention preferably include a particulate filler, which functions to increase the modulus and stiffness of the composition, and provides a more economical composition. Any conventional filler can be employed provided that it provides all or a portion of the above-identified functions, and does not otherwise have a deleterious effect on the composition. The fillers may optionally be treated with various coupling agents or adhesion promoters as is known to those skilled in the art. Useful fillers may be selected from a wide variety of minerals, metals, metal oxides, siliceous materials, metal salts, and mixtures thereof. Examples of such useful fillers include glass fibers, carbon fibers, alumina, aluminum hydrates, feldspar, talc, calcium carbonates, clay, carbon black, glass quartz, novaculite and other forms of silica, kaolinite, bentonite, garnet, mica, saponite, beidellite, calcium oxide, calcium hydroxide, and the like such fillers are well known materials and are readily available. The foregoing recited fillers are illustrative only and are not meant to limit the scope of the fillers that can be employed in this invention. In the preferred embodiments of this invention fibrous materials are the fillers of choice, and glass fiber is the filler of choice in the particularly preferred embodiments of this invention.

The quantity of filler employed is not critical add can be varied widely as desired. In the preferred embodiments of this invention, the quantity of filler is up to about 150 weight percent based on the total weight of the polymer and phosphite components, and in the particularly preferred embodiment is in the range of from about 30 to about 110 weight percent on the same basis.

It is also very desirable to include plasticizers of the types known in the art for use with polymer composition. Useful plasticizers may vary widely and will depend on the type of polymers employed and other factors known to those of skill in the art.

The process of this invention provides extended chain or branched polyesters and graft and/or block polyesters or copolyesters having decreased melt indexes and increased viscosities. Such polymers are useful as tire cord in pneumatic tires, and in the manufacture of films and molded parts. Such uses for polyester materials are well known in the art and will not be described herein in great detail.

The improvement or maintenance of the color quality of polyester can be determined by forming two amorphous films of desired thickness, e.g. 0.5 to 5 μm. One film is prepared from a chain extended polyester produced according to the process of this invention and the other film is prepared having one or more of the substances that are excluded from the chain extended polyester of this invention. One can measure the difference in the color quality of the films using visible light spectrometer or other known methods. The degree of color change can be measured by a microdensitometer. See H. P. Klug and L. E. Alexander, "X-ray Diffraction Procedures" Wiley-Interscience, New York, 1974, pp 114–116; G. H. Stout and E. H. Jenson, "X-ray Structures Determination" Macmillan, London, 1968, pp 165–211 and S. M. Aharoni, V. Kramer and D. A. Vernick, *Macromolecules*, 21, 265–271, at 266, (March-April 1979). Microdensitometers, are commercially available from the Shimadzu Company.

Another way to detect the improved color quality is to place the two films side by side on a substantially white background. The improvement in color quality is readily apparent to the human eye.

When an amorphous film is prepared of a desired thickness, e.g. about 0.5 to 5 μm, from the chain extended polyester, preferably, the amount of transmission (as measured by a microdensitometer) through the film formed from the chain extended polyester is at least about 80% of the transmission through a film formed from the reactant polyester. More preferably, the amount of transmission through the film formed from the chain extended polyester is at least about 85% of the transmission through a film formed from the reactant polyester. In further preferred reactants, the amount of transmission through the film formed from the chain extended polyester is at least about 90% of the transmission through a film formed from the reactant polyester. In particularly preferred embodiments, the amount of transmission through the film formed from the chain extended polyester is at least about 95% of the transmission through a film formed from the reactant polyester. In more particularly preferred embodiments, the amount of transmission through the film formed from the chain extended polyester is at least about 99% of the transmission through a film formed from the reactant polyester.

The following specific examples are presented to more particularly illustrate the invention, and should not be construed as being limitations on the scope and spirit of the invention.

EXAMPLES

In these examples, various representative embodiments of this invention were carried out employing the following general mixing and melt processing procedures.

A. Mixing

PET obtained in the form of ⅛" (0.3175 cm) pellets was ground into 12 mesh size particles. After weighing in wide-mouth jars, the PET samples were dried for 16 hours at 100°–110° C. in a vacuum oven. This drying step was done prior to blending, and the samples were kept in sealed jars during interim periods to maintain dryness. Weighed amounts of the phosphite additives were added to the polymers and the sealed jars were rotated on a rolling mill for 0.5 hr. This rotation action effectively coated the surface of the pellets with the phosphite additives.

B. Melt Processing

Each time about 60 grams of the mixtures were charged into the cavity of a Haake Rheocord-90 melt blending instrument and processed at preset temperatures in the range of about 270° to 300° C. for up to 20 minutes before being discharged. The instrument was set to 50 rpm. After the material was discharged, it was rapidly cooled to ambient temperature (approximately 23° C.) upon which it was characterized by solution viscosity to determine its intrinsic viscosity and by repeated heat-cool cycles in the DSC instrument to determine its crystallization temperatures. The torque values of the Haake instrument are a direct indication of the melt viscosity of the polymer during a processing stage. The higher Torque values indicate and increase in the viscosity caused by the chain extension process of this invention (i.e. the chain extension brought about by mixing together the polymeric chain ends with the aryl phosphite.

The determination of the extended chain polyester or block or graft copolyester formation is noted by the relative increases in viscosity. Reduced viscosity was measured at 23° C. 0 5% concentration of polymer in 60:40 phenol/tetrachloroethane solvent mixture. A description of the materials used for the experiments and their physical properties, i.e. intrinsic viscosity [η], and torque values measured by the Haake Rheocord-90 are set forth in the TABLE I.

Table I demonstrates the dramatic increases in melt viscosity (torque) or polyesters reacted with aryl phosphite. PET's polymerized with Ge or Ti-containing catalyst did not discolor upon processing with aryl phosphite. PET polymerized with Sb-containing catalyst turns grey under similar conditions. Color differences were easily detected by the human eye.

From the table one clearly gathers that the chain extension of the polyester under these conditions is completely independent of the nature of the catalyst used for the polycondensation reactions during polymer preparation. The discoloration is not independent of the chain extension process.

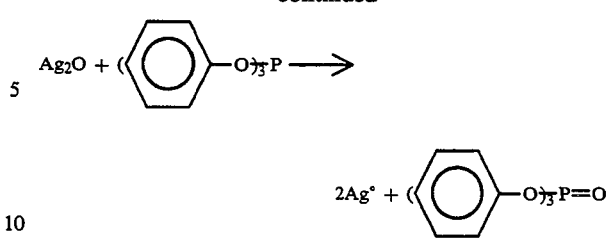

The reactions products were determined by $^1$H and $^{31}$P-NMR, IR, XRD and element analyses. No reactions took place between TPP and oxides or organic salts and complexes of elements designated in the Table II below as inactive. The numbers (1–33) in FIG. 1 correspond to the inactive oxides for which color was unchanged. The letters (A–F) in FIG. 1 correspond to the active oxides which produce dark solid elements. FIG. 1 graphs the heat of formation of oxide per oxygen atom (in kjoule/mole) vs the groups of the periodic table to which the oxide belongs. It should also be noted that the reactions between the active oxides and TPP take place below their melting points, i.e., the reactions is a solid/liquid reaction. A list of the melting points of tested oxides is given in Table III.

TABLE I

| SAMPLE CODE | INITIAL I.V. dL/g | POLY M. CATALYST, ppm | TRIPHENYL-PHOSPHITE (TPP) | HAAKE MACHINE TORQUE AFTER PROCESSING | | | | I.V. AFTER 20 MID HAAKE PROC. |
|---|---|---|---|---|---|---|---|---|
| | | | | AT 275 ± 3° C. | | AT 285 ± 3° C. | | |
| | | | | 8 MIN. | 20 MIN. | 8 MIN. | 20 MIN. | |
| 1 | 1.01 | GeO$_2$ 450 ppm | NONE | — | — | 145 | 78 | 0.65 |
| 2 | 1.01 | GeO$_2$ 450 ppm | 1.5% | 1001 | 373 | — | — | 0.92 |
| 3 | 1.01 | GeO$_2$ 450 ppm | 1.5% | — | — | 481 | 119 | 0.70 |
| 4 | 0.95 | Ti TYZOR 35 ppm | NONE | — | — | 166 | 119 | 0.61 |
| 5 | 0.95 | Ti TYZOR 35 ppm | 1.5% | 2004 | 611 | — | — | 0.94 |
| 6 | 0.95 | Ti TYZOR 35 ppm | 1.5% | — | — | 1035 | 290 | 0.74 |
| 7 | 0.90 | Sb ACETATE 450 ppm | NONE | — | — | 88 | 72 | 0.73 |
| 8 | 0.90 | Sb ACETATE 450 ppm | 1.5% | 383 | 367 | — | — | 0.77 |
| 9 | 0.90 | Sb ACETATE 450 ppm | 1.5% | — | — | 285 | 243 | 1.63 |

In addition to reactions in the molten polymer, model reactions were conducted in the absence of polymer or solvent (the TPP serves as solvent when appropriate) at temperatures of 180° C. and 240° C. These reactions progress slower with trialkylphosphites (e.g. tributyl phosphite).

Typical reactions are:

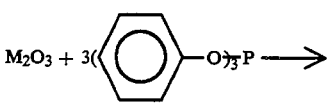

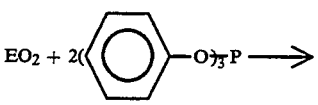

where M = As, Sb, Bi.

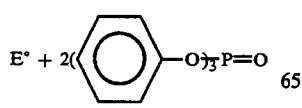

where E = Se, Te.

TABLE II

| FIG. NO./LETTER | OXIDE |
|---|---|
| 1 | H$_2$O |
| 2 | BaO |
| 3 | CaO |
| 4 | ZrO$_2$ |
| 5 | V$_2$O$_3$ |
| 6 | TiO$_3$ |
| 7 | NbO |
| 8 | VO |
| 9 | VO$_2$ |
| 10 | Nb$_2$O$_5$ |
| 11 | V$_2$O$_5$ |
| 12 | MnO |
| 13 | WO$_3$ |
| 14 | MnO$_2$ |
| 15 | MoO$_3$ |
| 16 | FeO |
| 17 | Fe$_2$O$_3$ |
| 18 | CoO |
| 19 | NiO |
| 20 | CrO$_3$ |
| 21 | RuO$_2$ |

TABLE II-continued

| FIG. NO./LETTER | OXIDE |
|---|---|
| 22 | Cu$_2$O |
| 23 | PbO$_2$ |
| 24 | GeO$_2$ |
| 25 | SnO$_2$ |
| 26 | SnO |
| 27 | In$_2$O$_3$ |
| 28 | P$_2$O$_5$ |
| 29 | ZnO |
| 30 | P$_2$O$_3$ |
| 31 | B$_2$O$_3$ |
| 32 | SiO$_2$ |
| 33 | Al$_2$O$_3$ |
| A | Sb$_2$O$_3$ |
| B | As$_2$O$_3$ |
| C | Bi$_2$O$_3$ |
| D | TeO$_2$ |
| E | SeO$_2$ |
| F | Ag$_2$O |

TABLE III

MELTING POINTS OF TESTED OXIDES, °C.[a]

| OXIDE | M.P., °C. | OXIDE | M.P., °C. |
|---|---|---|---|
| Al$_2$O$_3$ | 2015 | P$_2$O$_3$ | 23.8 |
| Sb$_2$O$_3$ | 656 | P$_2$O$_5$ | 580 |
| As$_2$O$_3$ | 315 | RuO$_2$ | 1200 |
| BaO | 1923 | SeO$_2$ | 340 |
| Bi$_2$O$_3$ | 820 | SiO$_2$ | 1610 |
| B$_2$O$_3$ | 460 | Ag$_2$O | 230 decomposes |
| CaO | 2580 | TeO$_2$ | 733 |
| CrO$_3$ | 196 | SnO | 1080 |
| CoO | 1935 | SnO$_2$ | 1127 |
| Cu$_2$O | 1235 | TiO$_2$ | 1825 |
| GeO$_2$ | 1086 | WO$_3$ | 1473 |
| H$_2$O | 0.00 | VO | 950 |
| In$_2$O$_3$ | 850 | V$_2$O$_3$ | 1970 |
| FeO | 1420 | VO$_2$ | 1967 |
| Fe$_2$O$_3$ | 1565 | V$_2$O$_5$ | 690 |
| PbO$_2$ | 290 | ZnO | 1975 |
| MnO | 1650 | ZrO$_2$ | 1715 |
| MnO$_2$ | 535 | | |
| MoO$_3$ | 795 | | |
| NiO | 1990 | | |
| NbO | >240 | | |
| Nb$_2$O$_5$ | 1460 | | |
| Nb$_2$O$_3$ | 1780 | | |
| OsO$_4$ | 40 | | |

[a]values from handbook of Chemistry & Physics and Alfa Catalog of Research Chemicals.

What we claim is:

1. A process for forming extended chain polyesters which comprises
   (a) forming an intimate mixture of one or more polyesters, and an effective amount of one or more effective phosphorous (III)-containing chain extension reagent;
   (b) heating said mixture for a time and at a temperature sufficient to form said extended chain polyester without discoloration of said extended chain polyester beyond that caused by heating alone; wherein the polyester used in step (a) were prepared with a catalyst or catalyst mixture that does not contain salts or compounds of the elements from groups VA and VIA of the periodic table in elemental form or any other form.

2. A process for forming extended chain polyesters which comprises:
   (a) forming an intimate mixture of one or more polyesters, and an effective amount of one or more effective phosphorous (III)-containing chain extension reagent compounds;
   (b) heating said mixture for a time and at a temperature sufficient to form said extended chain polyester without discoloration of said extended chain polyester beyond that caused by heating alone; wherein the polyesters used in step (a) were prepared with a catalyst or catalyst mixture that does not contain salts or compounds of antimony, arsenic, bismuth, tellurium and selenium.

3. The process of claim 1 wherein the polyester of step (a) is prepared by using a catalyst selected from polyester catalysts containing elements belonging to groups IIA, IIIA, IVA, VB, IIB, IIIB, IVB, VIII and the lanthanides.

4. The process of claim 1 wherein the polyester of step (a) is selected from polyester containing substances belonging to groups IIA, ILIA, IVA, VB, IIB, IIIB, IVB and VIII.

5. The process of claim 3 wherein the catalysts are selected from catalysts which contain calcium, magnesium, titanium, zirconium, vanadium, zinc, cobalt, manganese, aluminum, boron, indium, silicon, germanium, tin and a combination thereof.

6. The process of claim 1 wherein the chain extension reagent is a compound containing a trivalent phosphorus atom (phosphorus III) to which is attached at least one effective leaving group, but not more than three leaving groups; wherein the leaving group contains a hetero atom bonded to the phosphorus atom, and the hetero atom is bonded to a carbon which is double bonded to an atom other than the hetero atom.

7. The process of claim 6 wherein the hetero atom of leaving group is nitrogen or oxygen.

8. The process of claim 6 wherein at least one leaving group of the chain extension reagent is cyclic.

9. The process of claim 8 wherein at least one leaving group of the chain extension agent is aromatic.

10. The process of claim 1 wherein the intimate mixture is a molten mixture.

11. The process of claim 1 wherein the polyesters are selected from poly(ethylene terephthalate), poly(butylene terephthalate), poly(ethylene naphthalate), poly(ethylene/terephthalate/2,6-naphthalene dicarboxylate) and poly(tetramethylene/terephthalate/2,6-naphthalene dicarboxylate).

12. The process of claim 1 wherein the polyesters are selected from poly(ethylene terephthalate), poly(butylene terephthalate), and poly(ethylene naphthalate).

13. The process of claim 1 wherein the polyester is poly(ethylene terephthalate).

14. The process of claim 1 wherein the polyester is poly(ethylene naphthalate).

15. A polyester prepared in accordance with the process of claim 1.

16. A polyester prepared in accordance with the process of claim 12.

17. The process of claim 1 wherein the polyester used in step (a) contains no or substantially no silver oxide.

18. An article formed totally or in part from one or more extended chain polyesters of claim 1.

19. A polyester prepared in accordance with the process of claim 1.

20. The process of claim 1 wherein the intimate mixture is a granulated mixture.

21. A process for improving the melt viscosity of extended chain polyesters which comprises:
   (a) polymerizing polyester with a catalyst or catalyst mixture that does not contain salts or compounds of the elements from groups VA and VIA of the periodic table in elemental form or any other form;

(b) forming an intimate mixture of one or more of said polyesters prepared in step (a), one or more chain branching agents, and an effective amount of one or more effective phosphorous (III)-containing chain extension reagent compounds;

(c) heating said mixture for a time and at a temperature sufficient to form said extended chain polyester without discoloration of said extended chain polyester beyond that caused by heating alone.

22. The process of claim 21 wherein the catalysts are selected from catalysts which contain calcium, magnesium, titanium, zirconium, vanadium, zinc, cobalt, manganese, aluminum, boron, indium, silicon, tin or a combination thereof.

* * * * *